(12) United States Patent
Montelius

(10) Patent No.: US 7,702,317 B2
(45) Date of Patent: Apr. 20, 2010

(54) SYSTEM AND METHOD TO QUERY WIRELESS NETWORK OFFERINGS

(75) Inventor: Johan Montelius, Bromma (SE)

(73) Assignee: M:Metrics, Inc., Seattle, WA (US)

( * ) Notice: Subject to any disclaimer, the term of this patent is extended or adjusted under 35 U.S.C. 154(b) by 840 days.

(21) Appl. No.: 11/452,646

(22) Filed: Jun. 14, 2006

(65) Prior Publication Data

US 2007/0254635 A1    Nov. 1, 2007

Related U.S. Application Data

(60) Provisional application No. 60/795,543, filed on Apr. 27, 2006.

(51) Int. Cl.
*H04M 3/42*  (2006.01)

(52) U.S. Cl. .................................. 455/414.1; 455/415

(58) Field of Classification Search ... 455/414.1–414.3, 455/410, 415; 709/228
See application file for complete search history.

(56) References Cited

U.S. PATENT DOCUMENTS

2004/0205198 A1*  10/2004  Zellner et al. ............... 709/228

* cited by examiner

*Primary Examiner*—George Eng
*Assistant Examiner*—Michael Faragalla
(74) *Attorney, Agent, or Firm*—Fish & Richardson P.C.

(57) ABSTRACT

A system and method to collect all the offerings of a wireless service provider. Wireless service providers have different types of offerings, said offerings depending on the type of wireless client device being used. A single type of device, linked to an emulation computer, can 'spoof' the identification of all the devices that the wireless service provider supports. The emulation computer traverses the links made available by the wireless service provider for the type device the emulation computer is 'spoofing'.

10 Claims, 3 Drawing Sheets

Phone Models

Manufacturer A

|         | Content 1 | Content 2 | Content 3 | Content 4 | Content 5 | Content 6 | Content 7 |
|---------|-----------|-----------|-----------|-----------|-----------|-----------|-----------|
| Model A1 | x |   | x |   | x |   |   |
| Model A2 | x | x | x |   | x | x | x |
| Model A3 |   | x |   | x | x |   |   |

Manufacturer B

|         | Content 1 | Content 2 | Content 3 | Content 4 | Content 5 | Content 6 | Content 7 |
|---------|-----------|-----------|-----------|-----------|-----------|-----------|-----------|
| Model B1 | x |   |   |   |   |   | x |
| Model B2 | x | x | x | x | x |   |   |
| Model B3 | x |   |   |   |   | x |   |
| Model B4 | x | x | x |   |   |   |   |
| Model B5 | x | x |   |   |   |   |   |

Content Offered by Wireless Provider

*FIG. 1*

SYSTEM AND METHOD TO QUERY WIRELESS NETWORK OFFERINGS

CROSS-REFERENCE TO RELATED APPLICATIONS

This application is entitled to the benefit of Provisional Application Ser. No. 60/795,543 filed Apr. 27, 2006.

BACKGROUND

1. Field

The present invention relates to using emulation software installed on a computer linked to at least one wireless client device, said computer sending instructions to the at least one wireless client device to emulate a variety of client device models and microbrowsers independent of the actual model and microbrowser linked.

2. Description of Related Art

The most common method currently employed to survey the various offerings made available by wireless service providers to the wireless WAP client browser of that provider is to purchase and try a variety of wireless devices and models. Each device and model is used to contact the wireless service provider. This is required because the offerings of a wireless service provider are dependent on the make and model of the wireless device. Therefore to catalog what offerings are made available to which type of wireless device, then each device that the wireless service provider maintains content for, must be represented. To do this, in the absence of the present invention, requires that many different user available devices and models must be used to traverse the wireless network's offerings to the wireless device's user. This is a time consuming and expensive method to find out what service providers offer to what type of user available client devices.

OBJECTS AND ADVANTAGES

Therefore one object of the present invention is to allow one particular wireless device make and model to collect the wireless service provider's offerings to all the makes and models of devices for which the wireless service providers support. Another object of the present invention is to collect in a database a listing of what offerings are available to which makes and models of client devices, sorted by wireless service providers. Another object of the present invention is to allow, quickly and easily, the addition of client device emulations as soon as new wireless devices appear on the market. Of course this is to be accomplished without having to actually purchase a new wireless device. The data collected by the present invention is valuable to the client device manufacturers, the wireless service providers and wireless device content providers in order to be able to maintain an awareness of the current market offerings and direction.

SUMMARY

Using a wireless device linked to and controlled by a computer running wireless device emulation software, the wireless device identification as to the type of device normally transmitted to the wireless service provider is substituted for by the emulation software. Therefore the make and model information normally transmitted by a particular wireless device is overridden by the linked emulation computer, thereby giving the particular wireless device used to contact the wireless service provider the ability act as a variety of wireless device makes and models. Any request by a wireless device for a page from a web server contains HTTP_ACCEPT header. This header contains the MIME (multipurpose internet mail extension) types that a browser can accept and read. The wireless device may also send a HTTP_USER_AGENT header accompanying the URL request. This header gives the identity of the client browser used by the wireless device and, typically, the phone make and model used to make the request. The wireless service provider can then query their database to match the information contained in these headers and determine, among other things, important device parameters such as screen size and browser capabilities. Another type of information that may be enclosed in the request for the URL is the User Agent Profile (UAProf), a specification established by the Open Mobile Alliance. This may also be used to establish the capabilities of the wireless device making the web page request. The UAProf is embedded in the request object generated by the wireless device in the process of getting the URL requested web page. In the WAP 2.x (wireless application protocol) specification, the UAProf is based on the Composite Capabilities/Preference Profiles (CC/PP) specification as defined by the W3C. The UAProf information sent by the wireless device is an easy way to allow wireless servers to adapt the information being sent according to the make and model of user's wireless device making the request.

BRIEF DESCRIPTION OF THE DRAWINGS

The invention is further described in connection with the accompanying drawings, in which:

FIG. 1 shows a matrix of available phone models and content provided by wireless carriers.

DETAILED DESCRIPTION OF THE PREFERRED EMBODIMENT

As shown in FIG. 1, a matrix of wireless service providers offerings (content) is adjusted to the make and model of the user's wireless device that is capable of receiving said content. The actual content may be the same that an ordinary web browser can access but this actual content may undergo modifications given the bandwidth, screen size limitations and GUI (graphical user interface) input capabilities of the user's wireless device being used to access the web page. An example of this content, but not to meant to be exclusive of other content, is games, catalog pages, video clips, sports scores, internet email, uploaded and downloaded photos, music downloads, graphics such as area maps, news stories, weather reports, and stock market information. Browsers such as Internet Explorer, Firefox and Netscape (all trademarks of their respective companies) having the full display, memory, processing and input capabilities of a desktop computer may easily process large and complicated file formats. However the browser clients of wireless devices such as cell phones have limitations in all these capabilities. Browser clients of wireless devices are continually expanding their capabilities, however, and wireless service providers must be sure to make the content available so their users can utilize the newer capabilities of the wireless devices but also must ensure that their content is also suitable to older wireless devices. Although any wireless device with limited memory and a small footprint browser will benefit from this invention and are included within its scope, the examples used are particularly relevant to cell phones.

FIG. 1 may also represent a table of information that is collected by the computer running the emulation software as it surveys the offerings of the wireless network providers. When a particular wireless web page is downloaded the emulation software determines the type of data the page contains. If the page contains links to other pages the emulation software traverses additional links until the last page reviewed shows no further links. The emulation software then returns to the previous page shown and determines if there were any additional links on that page. If there were additional links, the emulation software then selects a different link than previously selected and reviews the data retrieved by that link. In this iterative method all the links on all the pages made available by the wireless service provider for a particular phone manufacturer and model are traversed, reviewed and put into a database.

Figure 2:
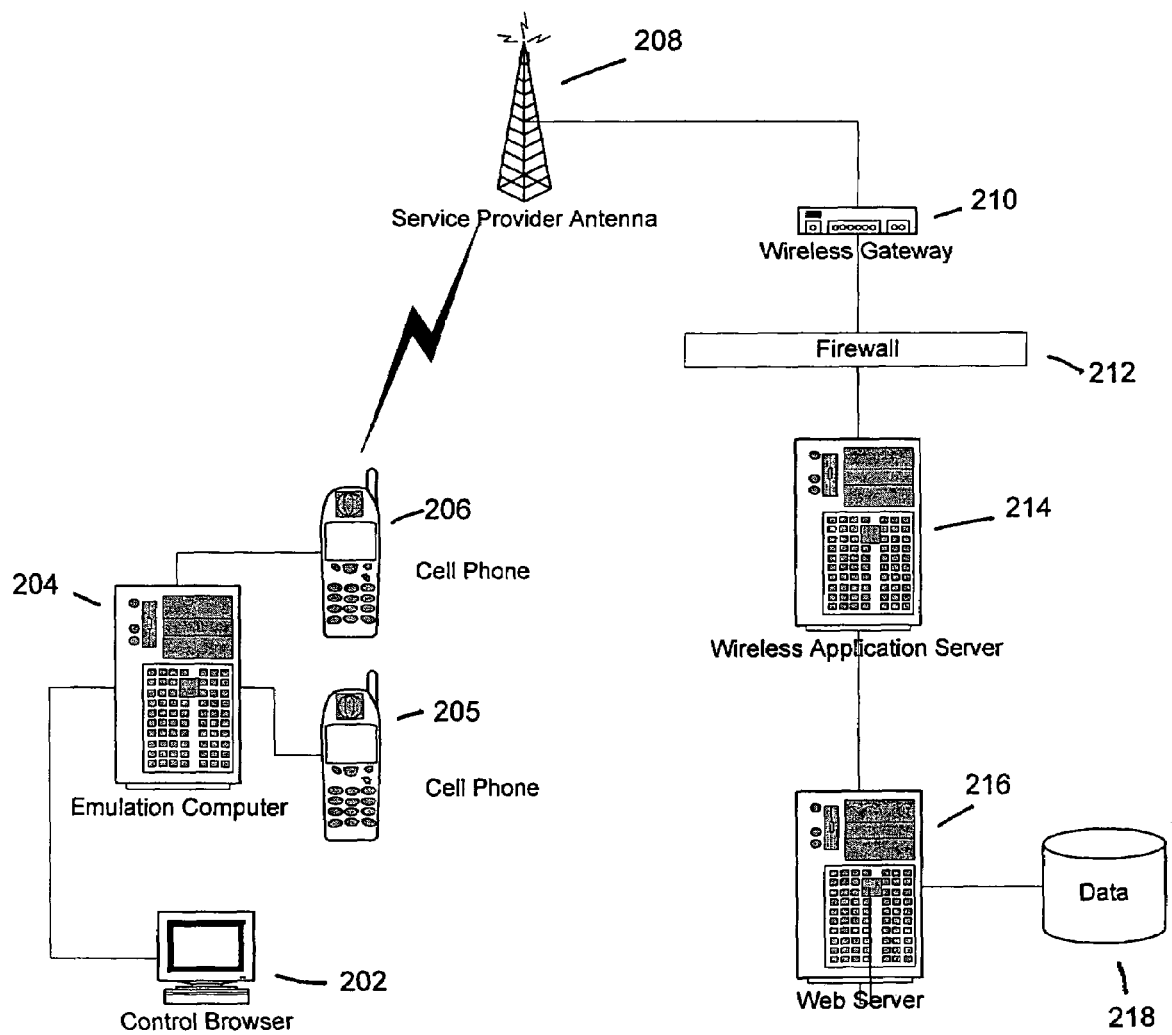
FIG. 2 shows a typical wireless network using a cell phone emulation computer.

FIG. 2 shows the elements that make up the wireless network. A command browser 202, linked to the emulation computer 204, is programmed to access TCP ports that the emulation computer 204 has associated to a operator and specific emulated device profile. The emulation computer is multi-homed, each operator network is accessed over a wireless device, 205 and 206, and have independent IP sub-nets. Configuration of the IP routing table will ensure that traffic directed to each of the operators network will use the appropriate wireless device as network interface. The emulation computer is also configured to perform operator specific domain name resolution, this is needed if the operator does not provide a wireless gateway, 210. The emulation computer will then have to do to a name resolution, finding the IP address given a host address of a wireless application server, 214. If a wireless gateway 210 is present the IP address of the gateway is fixed and no name resolution needs to be done. Each wireless device is connected to the emulation computer via a USB connector or similar link such as Bluetooth. The association of ports to operator and device can either be predefined or dynamically controlled. The control could be done either by a management system or in-band by the command browser. The command browser 202 will use the emulation computer 204 as a HTTP proxy. The emulation computer 204 transforms request from the command browser according to the emulated device profile and forwards the request to the associated operators wireless gateway or, if not present, directly to the wireless application server. Depending on the device emulated the request is sent using WSP, Wireless Session Protocol, or wireless profiled HTTP. The configuration of the emulating computer will ensure that the request is sent over the appropriate wireless device, 205 or 206. The request is sent over the airwaves and is picked up by the providers antenna 208. The wireless gateway 210, if present, transforms the wireless protocol used in the transmission into regular HTTP. The HTTP request, from either the emulating computer or the wireless gateway, is sent to the wireless application server 214. The wireless application server 214 identifies the wireless device and browser making the request and determines the required markup language, the size of the user interface, the types of graphics supported, the preferred language and other content limitations. If the content resides in a database 218 on another server 216 the wireless application server 214 will retrieve that content and transform it into suitable content for the requesting device and browser. The returned web page from the wireless provider 214 is then processed through the emulation computer 204 and sent back to the command browser 202. The command browser is either manually operated, and the web page is then displayed using a regular web browser, or automated in which case the page is processed and logged. A typical task for an automated command browser is to parse the returned web page and determine if another link is present on that page. This process is then iterated until all the offerings of that particular wireless provider for that particular wireless device have been exhausted. The command browser then selects the next make or model of phone in its database and requests its emulation by the emulation computer. The emulation computer is capable of connecting multiple phones or other types of wireless devices that may connect to a wireless service provider, each phone or device connected to a different wireless service provider. The command browser can use multiple threads to simultaneously traverse the offerings of these various providers for the various wireless devices they support.

A wireless gateway 210 built to WAP standards is designed to be used with any existing wireless service standards such as SMS (short message service), CSD (high-speed circuit switched data), GPRS (general packet radio service) and USSD (unstructured supplementary services data). The gateway may be hosted by the wireless service provider, although other third party hosts are possible. Along with the required protocols the WAP gateway also transmits a unique IP address for each wireless device requesting a URL.

Figure 3:
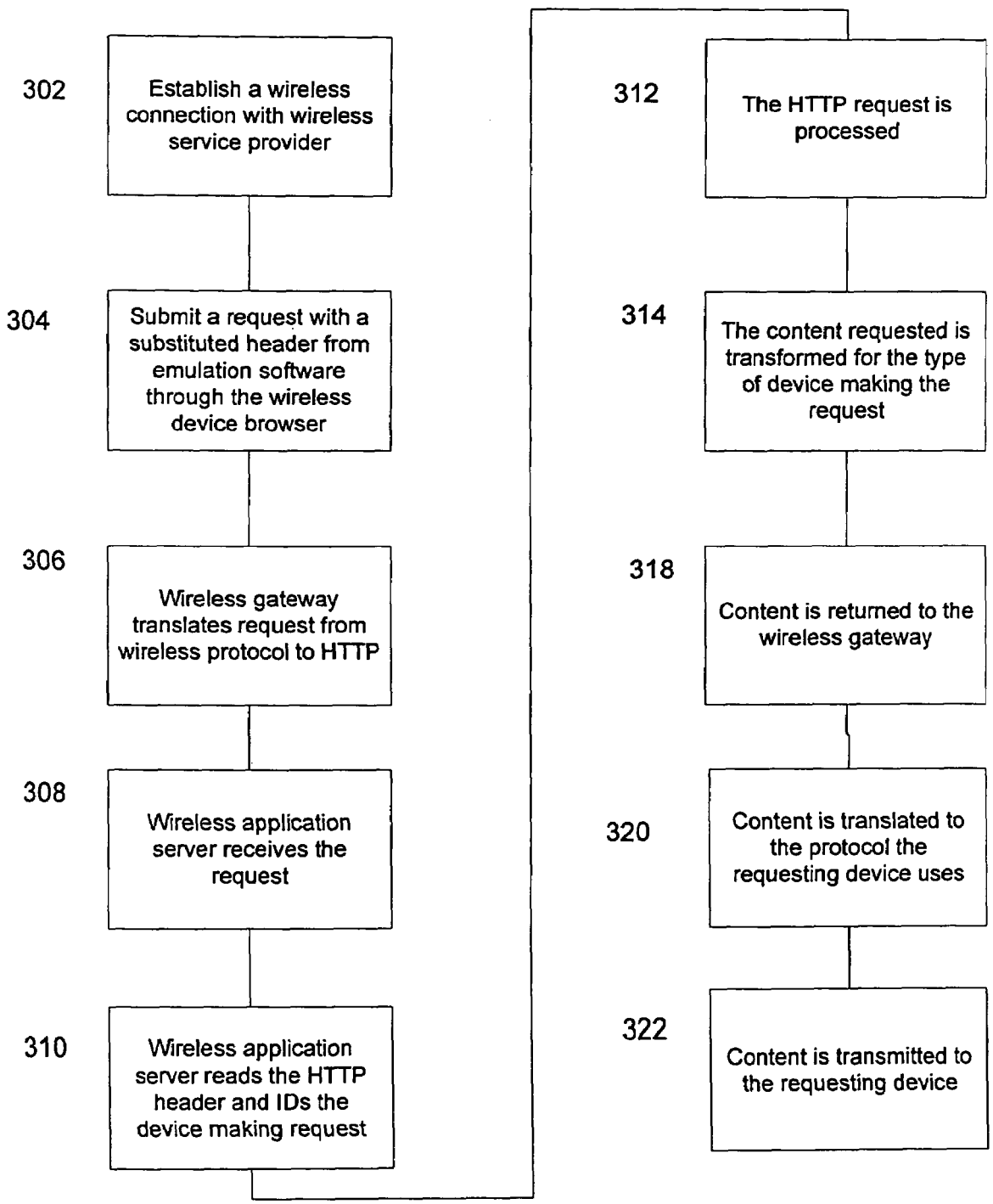
FIG. 3 shows the steps taken to gain access to the wireless network offerings.

FIG. 3 shows the steps necessary to implement the present invention. The wireless device first makes contact and establishes a connection with its wireless service provider and provides authentication that it is an authorized device 302. A request for an URL (uniform resource locator—"web address") is made by the command browser to the emulation computer and onto the wireless device, overriding the normal request that would usually be made by that make and model of wireless device 304. The request is processed through the wireless device and is sent to the WAP gateway, if present. The WAP gateway requests the URL with a standard HTTP (hypertext transport protocol) GET request 306. If no WAP gateway is present the request is sent directly to the web server specified in the URL.

On the internet, the wireless application server 308 holding the content associated with that URL (or a regular internet web server holding the content) reads the request and determines the type of browser making the URL request 310. If the browser type associated with the request is determined by the server to be of the microbrowser type then the server returns to the wireless gateway HTTP content 312 meant for that type of microbrowser. For example if the web server hosting that URL is an Apache web server the wireless device's microbrowser request may be redirected to a URL, containing web content customized for that particular microbrowser, using the Apache URL rewriting mod_rewrite capability. If the customized content held by the wireless service provider is in the form of textual WML (wireless mark-up language) then the wireless gateway using WAP protocol compiles the textual WML into WMLC (tokenized WML) 320. The tokenized WML is in fact compressed binary data (to reduce bandwidth usage). It is this tokenized WML that is sent back to the wireless device's emulation computer. An alternative to WML is XHTML MP (mobile profile). This is an extension of HTML (hypertext markup language) that enforces the strict syntax checking of XML. With the release of the WAP 2.0 standard for wireless gateways, XHTML MP content is passed straight through to the client wireless device without binary encoding although the wireless gateway using the WAP protocol still tracks usage by the client. Using a WAP gateway has an additional benefit of allowing optimization of the communication process and facilitates other wireless features such as location of the client, privacy of data. Using a WAP gateway also allows the WAP push protocol (the ability to send data to the client device without being requested). After the wireless gateway has translated the information it send that information back to the emulation computer making the request 322.

There exists information readily available on the web on the specific Http_User_Agent strings and UAProf descriptions that identify specific wireless devices and browsers; one such source is the WURLF database. These descriptions are however not complete and experiments with specific devices must often be performed to obtain the correct device profile.

If the command browser is a regular web browser it might not be able to handle all types of replies. A regular browser would for example not be able to handle WMLC coded pages nor a WAP multipart coded body. This can be solved either by appropriate recoding of content by the emulation computer, by extending the capabilities of the browser or a combination of both. Also automated tools can benefit if the recoding is done by the emulation computer. Although the preferred embodiment is using a computer running a command browser linked to a computer running the emulation software it is also possible to have the command browser and emulation software running on the same computer.

The underlying service provider's network is capable of distinguishing wireless devices using other ways than just the HTTP header information. If a service provider uses this capability and only sends content for that specific device then it will be necessary to practice this invention using the command browser, emulation computer and the actual wireless device for which offerings are desired to be noted and recorded.

Therefore, although the invention has been described as setting forth specific embodiments thereof, the invention is not limited thereto. Changes in the details may be made within the spirit and the scope of the invention, said spirit and scope to be construed broadly and not to be limited except by the character of the claims appended hereto.

I claim:

1. A method for surveying wireless service provider offerings, the method comprising:
    generating, at an emulation system associated with a wireless communication device, a first content request for content to be retrieved over a wireless network, wherein the first content request emulates a content request from a first type of wireless client device;
    sending, from the emulation system using the wireless communication device, the generated first content request to the wireless network such that the first content request is routed to a server that is configured to, in response to receiving the first content request, retrieve a version of the requested content that is associated with the first type of wireless client device and return the retrieved version of the requested content that is associated with the first type of wireless client device to the emulation system;
    receiving the returned version of the requested content that is associated with the first type of wireless client device at the emulation system from the wireless network;
    generating, at the emulation system, a second content request for content to be retrieved over the wireless network, wherein the second content request emulates a content request from a second, different type of wireless client device;
    sending, from the emulation system using the wireless communication device, the generated second content request to the wireless network such that the second content request is routed to a server that is configured to, in response to receiving the second content request, retrieve a version of the requested content that is associated with the second type of wireless client device and return the retrieved version of the requested content that is associated with the second type of wireless client device to the emulation system; and
    receiving the returned version of the requested content that is associated with the second type of wireless client device at the emulation system from the wireless network,
    wherein the first type of wireless client device comprises a first make and model and the second type of wireless client device comprises a second, different make and a model.

2. The method of claim 1, further comprising determining current market offerings based on the received version of the requested content that is associated with the first type of wireless client device and the received version of the requested content that is associated with the second type of wireless client device.

3. The method of claim 1, wherein sending, from the emulation system using the wireless communication device, the generated first content request to the wireless network comprises: establishing a connection with the wireless network; and sending authentication information to the wireless network, the authentication information being formatted to correspond with the protocol utilized by the wireless network.

4. The method of claim 1, wherein generating the first content request comprises including one or more values associated with the first type of wireless client device in a user agent header included in the first content request.

5. The method of claim 1, wherein generating the first content request comprises including User Agent Profile information associated with the first type of wireless client device in the first content request.

6. An emulation system for surveying wireless service provider offerings, the system comprising:
    one or more processing devices;
    a wireless communication device; and
    one or more storage devices storing instructions that, when executed, cause the one or more processing devices to:
    generate a first content request for content to be retrieved over a wireless network,
    wherein the first content request emulates a content request from a first type of wireless client device,
    send, from the emulation system using a wireless communication device, the generated first content request to the wireless network such that the first content request is routed to a server that is configured to, in response to receiving the first content request, retrieve a version of the requested content that is associated with the first type of wireless client device and return the retrieved version of the requested content that is associated with the first type of wireless client device to the emulation system,
    receive the returned version of the requested content that is associated with the first type of wireless client device at the emulation system from the wireless network,
    generate a second content request for content to be retrieved over the wireless network, wherein the second content request emulates a content request from a second, different type of wireless client device,
    send, from the emulation system using the wireless communication device, the generated second content request to the wireless network such that the second content request is routed to a server that is configured to, in response to receiving the second content request, retrieve a version of the requested content that is associated with the second type of wireless client device and return the retrieved version of the requested content that is associated with the second type of wireless client device to the emulation system, and receive the returned version of the requested content that is associated with the second type of wireless client device at the emulation system from the wireless network, wherein the first type of wireless client device comprises a first make and model and the second type of wireless client device comprises a second, different make and a model.

7. The system of claim 6, wherein the one or more storage devices further store instructions that, when executed, cause the one or more processing devices to determine current market offerings based on the received version of the requested content that is associated with the first type of wireless client device and the received version of the requested content that is associated with the second type of wireless client device.

8. The system of claim 6, wherein the instruction that, when executed, cause the one or more processing devices to send, from the emulation system using the wireless communication device, the generated first content request to the wireless network comprise instructions that, when executed, cause the one or more processing devices to: establish a connection with the wireless network; and send authentication information to the wireless network, the authentication information being formatted to correspond with the protocol utilized by the wireless network.

9. The system of claim 6, wherein the instruction that, when executed, cause the one or more processing devices to generate the first content request comprise instructions that, when executed, cause the one or more processing devices to include one or more values associated with the first type of wireless client device in a user agent header included in the first content request.

10. The system of claim 6, wherein the instruction that, when executed, cause the one or more processing devices to generate the first content request comprise instructions that, when executed, cause the one or more processing devices to including User Agent Profile information associated with the first type of wireless client device in the first content request.

* * * * *